United States Patent

Halldorsson et al.

[11] Patent Number: 4,682,024
[45] Date of Patent: Jul. 21, 1987

[54] LASER RADIATION WARNING SENSOR UTILIZING POLARIZATION

[75] Inventors: Thorsteinn Halldorsson, Munich; Ernst A. Seiffarth, Taufkirchen, both of Fed. Rep. of Germany

[73] Assignee: Messerschmitt-Bölkow-Blohm GmbH, Munich, Fed. Rep. of Germany

[21] Appl. No.: 826,240

[22] Filed: Feb. 5, 1986

[30] Foreign Application Priority Data

Apr. 13, 1985 [DE] Fed. Rep. of Germany ....... 3513350

[51] Int. Cl.$^4$ .............................................. G01J 1/20
[52] U.S. Cl. ................................. 250/225; 356/141; 356/152; 250/227
[58] Field of Search ............... 250/225, 203 R, 203 S, 250/227, 231 R; 356/152, 141, 364

[56] References Cited

U.S. PATENT DOCUMENTS 3,992,099 11/1976 Laughlin ............................. 356/141
4,589,776 5/1986 Carver et al. ....................... 250/225
4,625,108 11/1986 Nestel et al. ........................ 356/141

*Primary Examiner*—Edward P. Westin
*Assistant Examiner*—Jessica L. Ruoff
*Attorney, Agent, or Firm*—Kenyon & Kenyon

[57] ABSTRACT

A device for the recognition and directional detection of optical radiation, especially laser radiation, i.e., a so-called laser warning sensor. The laser warning sensor comprises several optical input systems to which a light guide path leading to a detector is assigned. In the individual light guide paths, polarizing devices for the linear polarization of the incident optical radiation are provided which determine for each light guide path at its end facing the detector, a specific direction of polarization which is different from the direction of polarization of the other light guide paths. The radiation leaving the ends of the light guide paths combined in a bundle is conducted to a detector designed as a polarimeter. From the direction of polarization determined in the polarimeter, the direction of the incident laser radiation is determined in an evaluation circuit.

14 Claims, 5 Drawing Figures

LASER RADIATION WARNING SENSOR UTILIZING POLARIZATION

BACKGROUND OF THE INVENTION

The present invention relates to laser warning sensors.

Lasers which radiate in the visible or in the infrared range are used, for instance, for the support of fire control systems. As a defense against an attack on the irradiated object which is to be expected after laser irradiation, it is therefore necessary to recognize this laser irradiation and its direction as immediately as possible so that countermeasures can be taken in time.

From DE-OS No. 33 00 849, a laser warning sensor with a hemispherical sensor head is known in which a multiplicity of light guides are uniformly distributed over the hemispherical surface and are fastened therein. The front end of the light guides lying in the surface of the hemisphere either serve as optical input systems or they are provided with lens caps which can collect laser or another optical radiation which is incident on the sensor from a defined direction and with a defined field of view about this direction. The other ends of the light guides are combined in a cable, the end face of which is opposite a detector matrix with a multiplicity of detectors. To each detector of this matrix is accordingly assigned a defined direction of view with a defined field of view. By an evaluation circuit following the detector matrix, the direction is recognized in a relationship between the detectors and the individual light guides, and the intensity of the incident radiation by adding up the detector signals. Some light guides are further fed to detectors which are wavelength selective and via which also the wavelength of the picked-up radiation can be determined in the evaluation circuit.

This known laser warning sensor is designed as an all-around sensor and can furnish entirely satisfactory results. However, this design can be realized only at high cost, especially because a multiplicity of thin light guides must be positioned exactly in the hemisphere surface and be brought, coordinated, to the individual detector elements of the detector matrix. This large number of light guides is necessary in order to obtain the desired angular resolution for the direction detection. Another disadvantage, even though minor, is the fact that the evaluation of the detector signals is made more difficult and possibly inaccurate if the optical apertures are partially soiled.

From DE-OS No. 33 23 828 owned by the assignee of the present application, a laser warning sensor is known in which the direction of incident laser radiation is determined by means of a propagation time measurement. The laser warning sensor has a hemispherical sensor head which, at the highest point, comprises a central detector and on the remaining hemisphere surface, several optical input systems, in the focal plane of each of which a light guide is arranged. The optical input systems have a defined direction of view with relatively large fields of view, the fields of view of adjoining optical input systems have some overlap. The light guides for each optical input system have different length, the gradations in length being, for instance five meters. All light guides are combined in a bundle and are brought to a common radiation detector. The evaluation circuit comprises a propagation time circuit which is started by the central detector if laser radiation is detected. As soon as the second detector receives a signal, the propagation time circuit is stopped. From the time interval between start and stop can then be calculated through which optical input system the laser radiation has been incident, so that thereby the direction can be determined from which the laser radiation comes.

This laser warning sensor is of relatively simple mechanical design. For a full angle of 360°, only relatively few optical input systems and therefore, light guides, are required. For a full angle of 360° in azimuth, for instance, only 36 optical input systems need to be provided which each cover a field of view with an aperture angle of about 25° Depending on the desired elevation angle, several such optical input systems arranged in rings must be provided. In spite of the small number of optical input systems and light guides, high angular resolution is possible since the individual fields of view overlap. The laser radiation incident on the laser warning sensor is therefore covered as a rule by several optical input systems. By electronic evaluation of the signals of the common direction detector, the time of the stop signal is determined by weighting the signals received by the common detector from different light guides. By this interpolation, an angular resolution of 1° can be achieved if, with the technical data of the laser warning sensor given, the evaluation circuit determines the center of gravity of the stop signal weighted in time, with an accuracy of 2.5 ns, which is possible without problem with fast computers and conventional electronic circuits.

The mentioned known laser warning sensors are suitable for recognizing and detecting the direction of pulsed and pulse width-modulated radiation, the former in principle also for continuous wave radiation.

SUMMARY OF THE INVENTION

It is therefore an object of the present invention to provide a laser warning sensor of the type discussed above, in which the mechanical design as well as the evaluation of the detector signals is considerably simplified over known solutions and which can be used at the same time for all modes of operation of the laser transmitter.

According to the invention, the direction of the radiation incident on the laser warning sensor is determined by polarization coding. In the individual light guide paths are provided between the optical input system and the preferably common detector, polarization devices which polarize the incident radiation linearly. This polarization takes place in such a manner that for each light guide path a specific plane of polarization is determined at its end facing the detector which is different from the other light guide paths. The detector, which is preferably common to all light guide paths, is designed as a polarimeter, with which the plane of polarization of the radiation incident from the light guide paths on the detector is determined. In the following evaluation circuit, the direction of the incident radiation can then be determined as a function of the determined plane of polarization.

The design of the laser warning sensor is very simple. Thus, like in the above-mentioned DE-OS No. 33 23 828, only a few optical input systems are required if their fields of view overlap. As optical input systems, the end faces of the light guides may be usable, possibly after modification, or separate optical input systems, in the focal plane of which the end faces of the light guide are then arranged.

Contrary to the known warning sensors described above, only short light guides are necessary in the sensor of the present invention because no propagation time coding is performed.

For measuring the direction of polarization of the radiation incident on the detector, i.e., the polarimeter, the light vector is split into two orthogonal polarization components in a birefringent prism of the Wollaston, Foster or Glan-Thompson type, where these components leave the birefringent prism physically separated as the ordinary and extraordinary ray. Each of the two rays fall on a photo detector, from the photo currents of which the direction of polarization can then be determined in a manner known per se.

Since the fields of view of the optical input systems have mutual overlap, the incident laser radiation is passed on as a rule to the polarimeter via several light guides. In the polarimeter, the averaged direction of polarization is automatically determined by a vector addition. By interpolation of this averaged direction of polarization, the direction of the laser radiation can be determined with high angular accuracy with respect to the direction of polarization assigned to the two adjacent optical input systems.

As is common practice, the incident laser radiation can be filtered out from the background illumination by narrow-band filters, for instance, interference filters. If measurements are to be made in several spectral ranges, the radiation coming from the light guides can be subdivided, for instance, by dichroic ray dividers, into several separated rays of different wavelength which are then measured individually with separate polarimeters.

The determination of the plane of polarization at the ends of the light guide paths facing the respective detector can be accomplished in different ways.

Thus, polariztion-preserving light guides can be used. Such light guides, which pass on linearly polarized light without depolarization of the light vector, have been obtainable in the market place for some time. For this case, a polarizer, for instance, a polarization filter, is provided in the vicinity of the optical input system, which polarizes the incident radiation linearly. The ends of the light guides are fixed so in the vicinity of the detector that a different angle of polarization is present for each direction of view.

Monomode or multimode light guides, which have been known for some time, can be used as polarization preserving light guides. Due to the absence of stresses of the light guide material and small optical scattering, such light guides retain the state of polarization of the coupled-in light over a length of several meters without apreciable depolarization. In newer polarization preserving light guides, birefringence is generated in the light guide material so that two distinct rays, i.e., an ordinary and an extraordinary ray, are passed on with perpendicularly polarized propagation modes. The technology of birefingent lightwave guides has in the meantime matured to the point that the polarization is preserved over kilometers. With such birefringent polarization preserving light guides, a polarization filter is arranged in the vicinity of the optical input system, of which the direction of polarization is adjusted to one of the preferred directions of polarization of the light guide. In order to obtain, at the end of the light guides facing the detector, different directions of polarization for the individual optical input systems, the directions of polarization of the polarization filter and the light guide must be aligned accordingly.

In some cases the direction of polarization can also be adjusted so that the light guides at the detector end are mechanically turned into the specific direction of polarization.

For adjusting the direction of polarization, also light guides which do not preserve the polarization can be used. In this case a micropolarization foil or, for IR radiation, a micro grid polarizer is applied to the detector end of the individual light guides, of which the direction of polarization is adjusted accordingly.

Since the required length of the individual light guides is relatively small and is in the range of some ten centimeters, the individual directions of polarization can be fixed also with relatively inexpensive light guides.

It is furthermore possible to determine in the evaluation circuit not only the direction but also the pulse or modulation form, so that thereby, an analysis of the laser radiation and thereby the kind of threat is made possible. The evaluation of the light guide signals with respect to direction and modulation is accomplished with high dynamic signal range. Thereby, a very good signal analysis and detection of the kind of threat is assured.

Other objects, features and advantages of the present invention will be apparent from the description which follows.

BRIEF DESCRIPTION OF THE DRAWINGS

The invention will be explained in greater detail in the following detailed description with reference to the drawings, in which.

DETAILED DESCRIPTION

Figure 1:
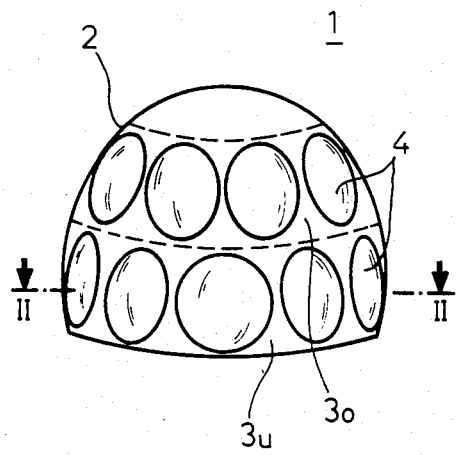
FIG. 1 shows a schematic perspective view of a laser warning sensor according to the invention.
Figure 2:
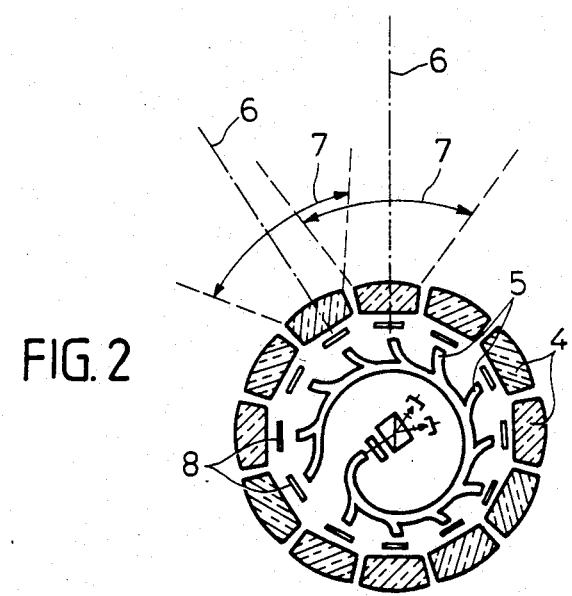
FIG. 2 shows a section along the line II—II through the laser warning sensor of FIG. 1 illustrating the internal design.

With reference now to the drawings, in FIG. 1, a laser warning sensor 1 with a hemispherical sensor housing 2 is shown. On the surface of two spherical layers 3u and 3o which lie on top of each other, several optical input systems 4 are arranged with close spacing. As shown in FIG. 2, 12 optical input systems 4 are provided, for instance. Approximately in the focal plane of each optical input system 4 is arranged the end face of a light guide 5 e.g. glass fibre. The optical input systems 4 have respective optical axes 6 according to the direction of view, and defined fields of view with always the same angles of view 7. The field of view is determined by the focal length of the optical input system 4, the aperture diameter of the respective light guide and the distance of the input pupil at the end face of the light guide from the focal plane of the optical input system. As shown in FIG. 2, the fields of view 7 of adjoining optical input systems overlap. Between each optical input system 4 and the end face of the assigned light guide 5, a polarization filter 8 is arranged, by which laser radiation incident on the sensor 1 is polarized linearly. The individual light guides are combined in a bundle 9 and fed via an optical channel 10 to a detector 11 in the form of a polarimeter. The output signals of the polarimeter 11 are fed to an evaluation circuit 12.

Figure 3:
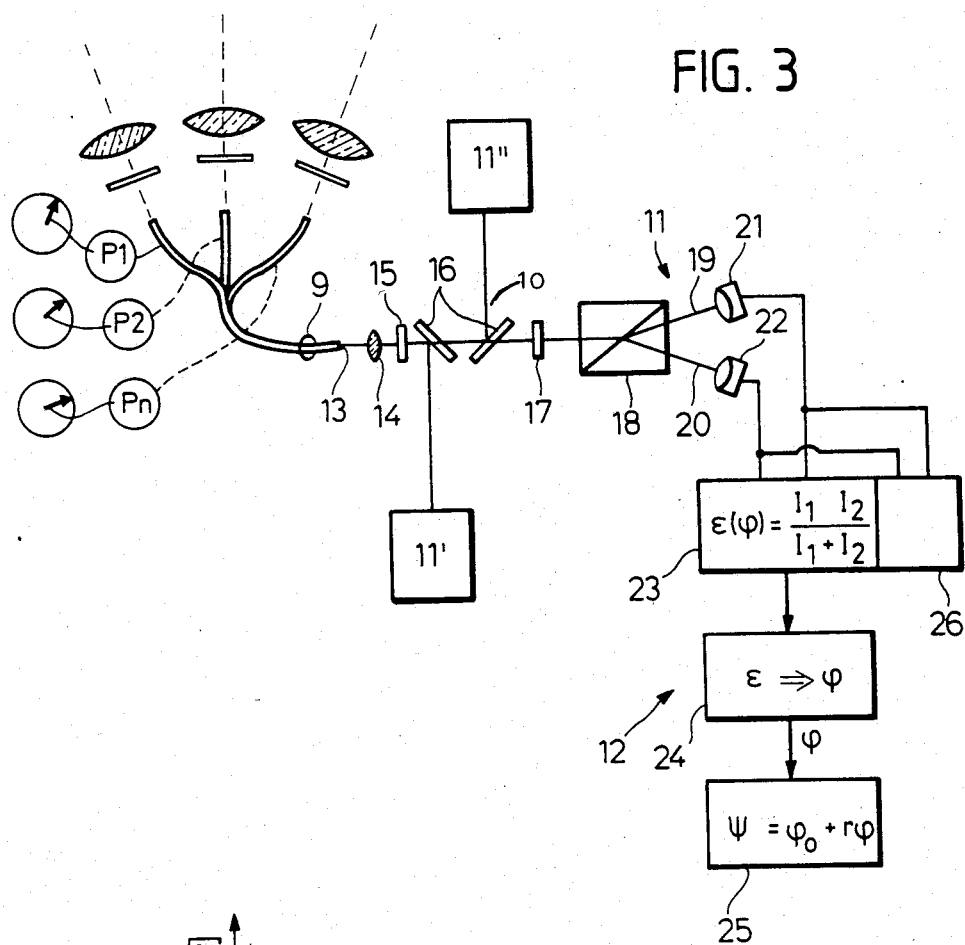
FIG. 3 is a schematic view of part of the laser warning sensor with a detector arrangement and a block diagram of the evaluation circuit to explain the signal evaluation.

The polarization filters 8 and the light guide 5 are of such a nature that always only light with a very definite direction of polarization P can issue at the detector end 13 of the individual light guides 5 of the light guide bundle 9. The directions of polarization P1, P2 . . . Pn (see FIG. 3) fixed for each light guide are rotated relative to each other so that a stepwise monotonic angular change of the directions of polarization of adjacent light guides is obtained. Independently of the state of polarization (linear, elliptical or depolarized) of an incident laser wave, the component of the radiation which leaves one or several light guides 5 at the detector end 13 is polarized strictly linearly.

Figure 4:
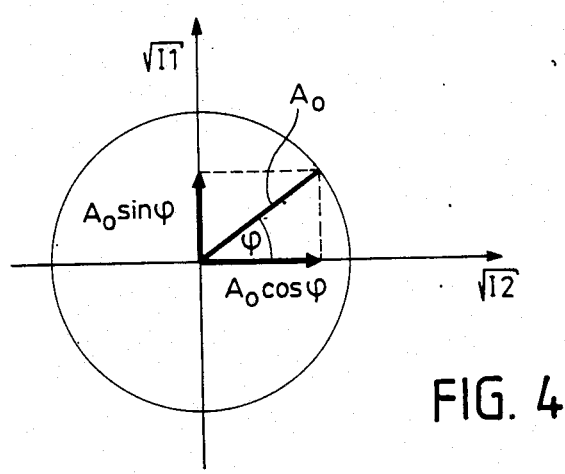
FIG. 4 is polarization diagram of the radiation incident on the detector.

The optical channel 10 comprises an optical input system 14 and, following the latter, a band filter 15, for instance, an interference filter, by which the spectral range of the laser radiation to be covered is separated from the background radiation. If laser radiation is to be picked up in several spectral ranges, several dichroic filters are arranged in the ray path which separate radiation of the specific spectral range. The separated radiation then passes a narrow-band interference filter 17 and falls on a birefringent prism 18. In this birefringent prism the polarized radiation is subdivided into an ordinary ray 19 and an extraordinary ray 20 which are polarized perpendicularly to each other and leave the birefringent prism 18 physically separated. The rays 19 and 20 fall on respective photo detectors 21 or 22, each of which deliver photo currents $I_1$ and $I_2$ according to the amplitudes of the two rays. As shown in the polarization diagram of FIG. 4, the two photo currents I1 and I2 can be represented for an amplitude A of the light vector as follows:

$$I1 = A_o^2 \cos^2 \phi$$

$$I2 = A_o^2 \sin^2 \phi \qquad (1)$$

The light vector $(\vec{A_o;\phi})$ is the vectorial sum of all light vectors striking the detector 11 through the detector end 13 of the light guide bundle 9, for instance, the sum of the light vectors leaving two light guides of adjacent optical input systems. After conventional signal preprocessing, for instance, by electronic filtering, the ratio $\epsilon(\phi)$ of the difference and the sum of the two signals is formed, for instance, by electronic filtering, i.e., $$\epsilon(\phi) = \frac{I_1 - I_2}{I_1 + I_2} = \cos^2\phi - \sin^2\phi \qquad (2)$$

This function shows in the angular range between 0° and 90° a monotonically declining and nearly linear course between the values +1 and −1. If linearity between $\epsilon$ and $\phi$ is assumed in a first approximation, the angle $\phi$ can be taken directly from the output signal $\epsilon(\phi)$ of the arithmetic circuit 23. For more stringent requirements as to the angle accuracy, the angle $\phi$ can be calculated in accordance with equation (2) by means of a small processor 24 connected thereto.

Depending on the arrangement of the polarization filters, the waveguide and the birefringent prism within the detector, the angle $\phi$ will not correspond directly to the angle of incidence $\Psi$ of the laser radiation with respect to a reference direction. Since in addition, the angle $\Psi$ of polarization over the angular range from 0° to 360° is ambivalent and can be measured unambiguously only over an angular range of 90°, the angle of incidence is determined as follows:

$$\Psi = \phi_0 + r\phi \qquad (3)$$

Here, $\phi_o$ is a fixed shift angle between the polarization angle $\phi$ and a reference direction of the laser warning sensor, and r is a fixed number. Since the angle of polarization can be measured from equation (3) unambiguously only over an angle range of 90°, a laser warning sensor covering, for instance, the full angle of 360° in azimuth could be designed, for instance, in such a manner that the optical input systems 4 offer, according to FIG. 2, overall an all-around view but that the angle measurement of $\phi$ takes place between 0° and 90° with r = 4. If high angular resolution and a large field of view is required in azimuth as well as elevation, the laser warning sensor can, of course, be composed of several separated or overlapping units.

The actual direction $\Psi$ of the laser radiation is indicated by a display 25 of the evaluation circuit 12.

In addition to the circuit groups for the detection of the direction of the incident laser radiation, the evaluation circuit 12 further comprises an analysis circuit 26, to which the photo currents $I_1$ and $I_2$ of the photo detectors 21 and 22 are fed. These photo currents can be evaluated with respect to pulse duration and pulse repetition frequency so that thereby, the kind of laser radiation can be determined in greater detail.

If the incident laser radiation is to be analyzed further in different spectral ranges, further detectors, for instance, 11' and 11", can be provided which process the radiation deflected by the dichroic filters 16 in the same manner. The evaluation circuits required therefor can be combined, of course, in a common functional block.

Figure 5:
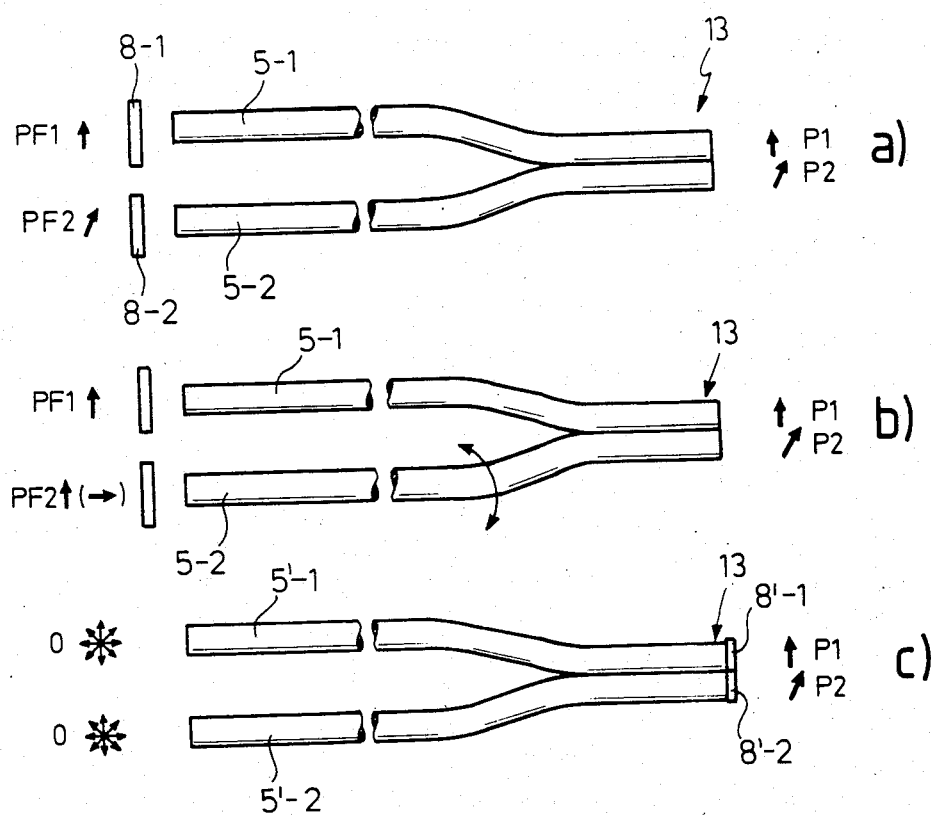
FIG. 5 shown several schematic views of the arrangement of two light guides with polarization devices for explaining the determination of related directions of polarization.

In FIGS. 5a, 5b and 5c, three arrangements are shown for determining the direction of polarization at the detector end 13 of two individual light guides. FIGS. 5a and 5b show arrangements with polarization-preserving light guides which can be used for the embodiment according to FIG. 2; the arrangement according to FIG. 5c shows an arrangement with light guides which do not preserve the polarization.

According to FIG. 5a, the two polarization filters 8-1 and 8-2 for two light guides 5-1, 5-2 are arranged between the optical input systems 4 and the input pupils of the light guides in such a manner that their directions of polarization PF1 and PF2 are shifted relative to each other as to angle. This direction of polarization is not changed in the light guides 5-1 and 5-2, so that the polarization directions P1 and P2 are present at the detector end 13.

In the arrangement according to FIG. 5b, the directions of polarization PF1 and PF2 of the polarization filters 8-1 and 8-2 are the same; as indicated in connection with PF2 in parentheses, the direction of polarization may also be crossed. In the length between the optical input system and the detector end 13, the light guides, in this case the light guide 5-2, are rotated mechanically in such a manner that at the detector end 13 there are again two different polarization devices P1 and P2 which are graduated as to angle. The mechanical rotation is indicated by a double arrow.

In the arrangement according to FIG. 5c, the polarization filter for the light guide 5'-1 is applied to the detector end of the light guides as a micro foil. The light guides are designated with 5'-1 and 5'-2, and the micro foils are designated with 8'-1 and 8'-2. By these micro foils, the two directions of polarization P1 and P2 are fixed at the detector end of the light guides 5'-1 and 5'-2 independently of the polarization of the light radiation striking the input pupils of the light guide which is shown here, by way of example, as unpolarized "0".

The described laser warning sensor can be utilized for pulsed or intensity-modulated lasers as well as for continuous lasers.

With the commercially available light guides with excellent transmission for light with wavelengths of 0.4 to 2.0 $\mu$m, the corresponding spectral range can be covered by the use of appropriate detectors; for wavelengths between 0.4 and 1.1 $\mu$m, these are silicon detectors; for wavelengths between 0.4 to 1.8 $\mu$m, germanium detectors; and for wavelengths of up to 2.0 $\mu$m ImGaAs detectors. Outside this spectral range, in which ruby, alexandrite, Nd : YAG and erbium lasers emit radiation, the $CO_2$ lasers with an emission line in the thermal infrared range are at present used for a wavelength of 10.6 $\mu$m. For this wavelength, light guides with lengths of about up to 3 meters have been available for a few years which can be used for lengths of about 10 centimeters in the proposed laser warning sensor with a corresponding detector. For evaluation, the usual detectors for medium infrared can then also be used for medium infrared, for instance, HgCdTe detectors. So-called grid polarizers can be used as polarizers which are common in the infrared range.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. Apparatus for the recognition and directional detection of optical radiation, especially laser radiation, including at least two optical input systems having two different directions of view with defined fields of view, and having respective light guide paths leading to a detector comprising a polarimeter and circuit means coupled to the detector for evaluating a signal from the detector, the respective light guide paths each having therein a polarization means for the linear polarization of radiation incident on the respective optical systems, said light guide paths terminating in an end facing the detector, said polarization means in each light guide path determining at said end facing the detector a specific direction of polarization different from the direction of polarization of each of the other light guide paths, said circuit means comprising means for determining a direction of each of the incident laser radiation as a function of the direction of polarization determined by said polarimeter.

2. The apparatus recited in claim 1, wherein said polarization means each comprise a polarization filter which is arranged in the vicinity of the respective optical input system and further comprising polarization-preserving light guide means.

3. The apparatus recited in claim 1, wherein said polarization means each comprise a polarization filter arranged at the detector end of the light guide paths.

4. The apparatus recited in claim 1 wherein the light guide paths comprise light guides.

5. The apparatus recited in claim 4, wherein the direction of polarization present at the detector end of the light guide is adjusted to a specific direction by mechanical rotation of the light guide.

6. The apparatus recited in claim 4, wherein the light guides of a plurality of optical input systems are combined in a bundle and are brought to a common detector.

7. The apparatus recited in claim 1 wherein the detector end of each of the light guide paths is in communication with an optical channel in which the radiation leaving the light guide paths is divided into several spectral ranges and is fed to a plurality of detectors.

8. The apparatus recited in claim 1 wherein said detector comprises a birefringent prism and two photo detectors assigned to respective ones of an ordinary ray and extraordinary ray generated by said prism.

9. The apparatus recited in claim 8, wherein the outputs of said two photo detectors are connected to an arithmetic circuit of said evaluation circuit means in which the ratio of the difference and the sum of respective photo currents of the two photo detectors is formed.

10. The apparatus recited in claim 1, wherein said evaluation circuit means comprises an analysis circuit for determining the pulse or modulation form of the incident laser radiation coupled to the output of the detector.

11. The apparatus recited in claim 1 wherein the fields of view of adjacent optical input systems overlap at least partially.

12. The apparatus recited in claim 1 wherein each of the light guide paths comprise light guides, the end faces of said light guides comprising said optical input systems.

13. The apparatus recited in claim 1 wherein each of the light guide paths comprise light guides having a separate optical input system coupled thereto.

14. The apparatus recited in claim 1 further comprising a hemispherical sensor housing on the surface of which said optical input systems are distributed.

* * * * *